United States Patent [19]
Henke

[11] 3,744,136
[45] July 10, 1973

[54] CONVERTER ACCESSORY FOR CALIPERS
[76] Inventor: John R. Henke, 701 S. Shore Drive, Kansas City, Mo. 64111
[22] Filed: Oct. 7, 1971
[21] Appl. No.: 187,288

[52] U.S. Cl. .............................. 33/169 R, 33/147 R
[51] Int. Cl. ............................................. G01b 5/02
[58] Field of Search ............... 33/169 R, 170, 143, 33/147

[56] References Cited
UNITED STATES PATENTS

| | | | |
|---|---|---|---|
| 2,367,743 | 1/1945 | Thorsberg | 33/169 R |
| 3,442,018 | 5/1969 | Viollet | 33/169 R |
| 2,844,878 | 7/1958 | Zwierzynski | 33/170 |
| 2,454,327 | 11/1948 | Malsom | 33/170 |

FOREIGN PATENTS OR APPLICATIONS

| | | | |
|---|---|---|---|
| 818,429 | 10/1951 | Germany | 33/169 R |
| 275,838 | 9/1951 | Switzerland | 33/169 R |
| 922,810 | 2/1947 | France | 33/170 |

Primary Examiner—Harry N. Haroian
Attorney—John A. Hamilton

[57] ABSTRACT

An accessory for converting an ordinary pair of vernier or dial calipers into a vertical height measuring instrument, consisting of a block supportable on any flat surface and having a slot formed in the upper surface thereof for receiving the fixed jaw of a pair of calipers therein whereby the beam of the calipers extends vertically upwardly and disposes the movable jaw of the calipers above said block, and an extension jaw attachable to said movable caliper jaw, said extension jaw being horizontally offset from said block and spaced below said movable caliper jaw by a distance equal to the height said fixed jaw is held above said flat surface by said block.

2 Claims, 9 Drawing Figures

PATENTED JUL 10 1973
3,744,136
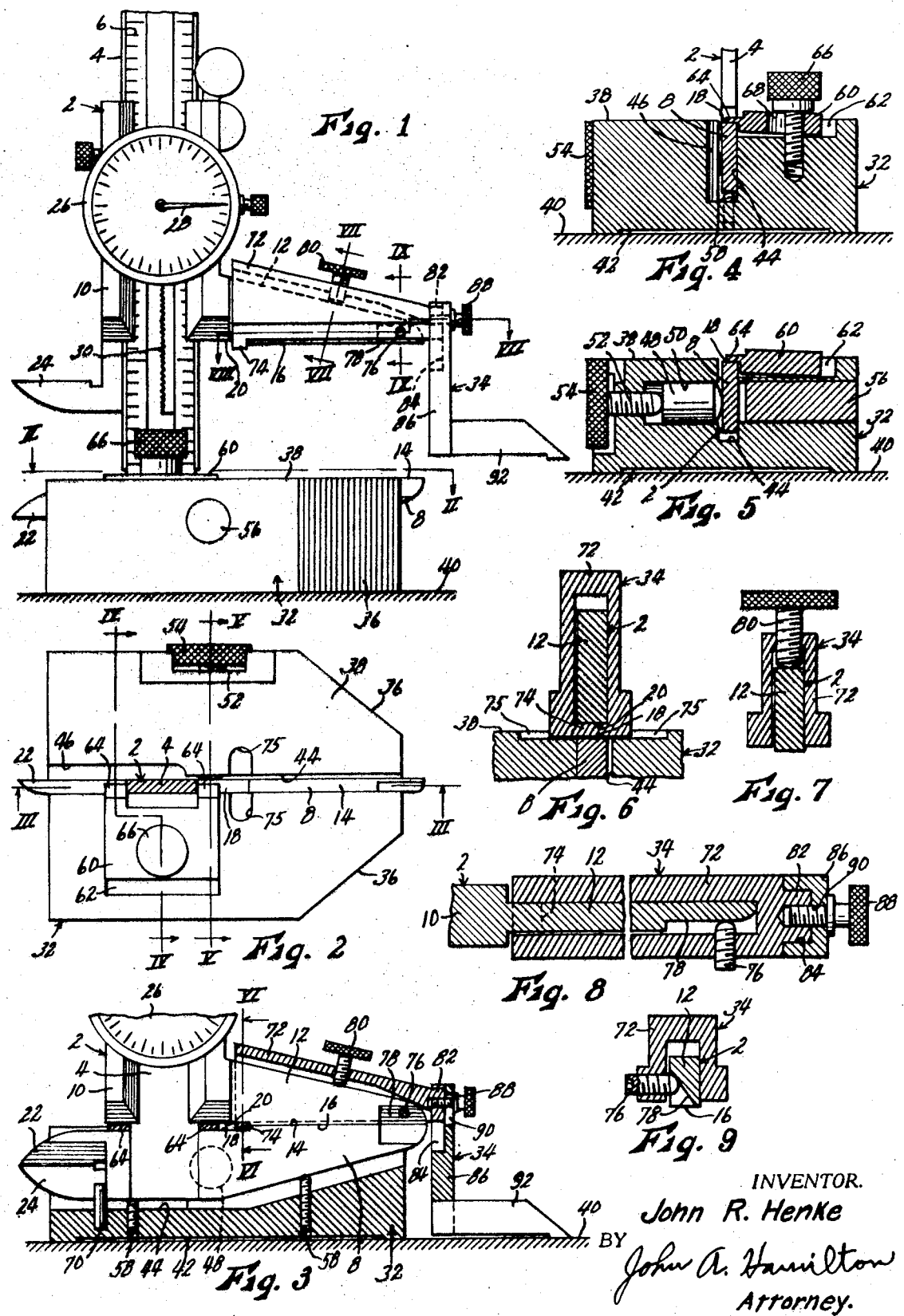
INVENTOR.
John R. Henke
BY John A. Hamilton
Attorney.

CONVERTER ACCESSORY FOR CALIPERS

This invention relates to new and useful improvements in accessories for ordinary vernier or dial calipers, and has as its principal object the provision of an accessory for converting virtually any pair of such calipers into an instrument for measuring the vertical height of any object resting on a planar surface. To this end, it includes a base to be supported on said planar surface, and in which the fixed jaw of the calipers is mounted, with the caliper beam, carrying the movable jaw, extending upwardly therefrom. It also includes an extension jaw mountable on the movable caliper jaw and offset downwardly from said movable jaw by a distance precisely equal to the elevation of the fixed jaw above the planar surface.

In this manner, the height of any object resting on said planar surface may be read directly from the calipers, without the application of any correcting factor to the caliper reading. By additionally placing the fixed caliper jaw precisely flush with the upper surface of the base mount, which is usually a steel block, direct caliper readings may be taken of the height of any object resting on the base block itself. In this case, the vertical thickness of the base block will of course be precisely equal to the vertical offset of the extension jaw. The direct reading referred to may also be called zero-reading, since all caliper readings are measured from the normal zero-mark of the caliper scale.

Another object is the provision of a device of the character described which will accommodate virtually any generally standard types of calipers, and which requires no modification whatsoever of the calipers themselves. This provision requires certain features of adjustability.

A further object is the provision of a device of the character described which may be adjusted to compensate for wear which occurs in normal usage.

Other objects are simplicity and economy of construction and efficiency and dependability of operation.

With these objects in view, as well as other objects which will appear in the course of the specification, reference will be had to the accompanying drawing, wherein:

FIG. 1 is a fragmentary side elevational view of a pair of dial calipers operatively mounted in a converter accessory device embodying the present invention, FIG. 2 is a sectional view taken on line II—II of FIG. 1, with parts left in elevation, FIG. 3 is a sectional view taken on line III—III of FIG. 2, with the caliper jaws closed, and with parts left in elevation, FIG. 4 is a sectional view taken on line IV—IV of FIG. 2, FIG. 5 is a sectional view taken on line V—V of FIG. 2, FIG. 6 is an enlarged, fragmentary sectional view taken on line VI—VI of FIG. 3, FIG. 7 is an enlarged sectional view taken on line VII—VII of FIG. 1, FIG. 8 is an enlarged fragmentary sectional view taken on line VIII—VIII of FIG. 1, partially broken away and foreshortened, and FIG. 9 is an enlarged sectional view taken on line IX—IX of FIG. 1.

Like reference numerals apply to similar parts throughout the several views, and the numeral 2 applies to a pair of calipers of the ordinary dial type including a straight beam 4 having a measuring scale 6 imprinted thereon, a first jaw 8 (hereinafter referred to as the fixed jaw) integral with or affixed to said beam and projecting laterally therefrom, a slide 10 mounted on and movable along beam 4, and a jaw 12 (hereinafter referred to as the movable jaw) integral with or affixed to said slide and projecting therefrom laterally of beam 4 to be aligned parallel with fixed jaw 8. The confronting edges of jaws 8 and 12, indicated respectively at 14 and 16, are precisely parallel, and are customarily relieved or notched directly adjacent beam 4, as indicated at 18 and 20 respectively. Many such claipers also include jaws 22 and 24, carried respectively by beam 4 and slide 10 and projecting from beam 4 oppositely from jaws 8 and 12, for the purpose of making "inside" measurements between opposed surfaces, but are not pertinent to the present invention except of course that they must be accommodated. In ordinary use, as to jaws 8 and 12, the thickness of any object disposed between said jaws is indicated by the position of slide 10 on beam 4, with large increments being indicated by the position of the lower edge of slide 10 relative to beam scale 6, and fractions of said large increments being indicated, customarily to .001 of an inch, by a dial indicator 26 mounted on slide 10 and having a pointer 28 driven by a suitable gear train from a pinion (not shown) meshed with a rack gear 30 fixed in the beam. Fine measurements may also be indicated by suitable cooperating vernier scales imprinted on the slide and beam, instead of the dial indicator shown. However, the calipers themselves are standard and well known in the art, and further detailed description of their specific structure is not pertinent to the present invention.

The conversion accessory forming the subject matter of the present invention consists of a base block indicated generally by the numeral 32, and an extension jaw assembly indicated generally by the numeral 34. Base block 32 is generally rectilinear, except that its forward corners may be cut away angularly as indicated at 36, for functional clearance. Its top and bottom surfaces are parallel so that its upper surface 38 will be disposed precisely parallel to any planar surface 40 on which the block is rested. The central portion of its lower surface may be relieved as indicated at 42, to further insure that it will rest securely and non-tiltably on surface 40. A slot 44 is formed in the top of block 32, extending the full length thereof along the midline thereof, for receiving fixed jaw 8 of the calipers, with operating edge 14 of said jaw precisely flush with the top surface of said block, and with caliper beam 4 projecting vertically upwardly from said block. Slot 44 is of sufficient width to admit jaw 8 despite all normal variations in the thickness of said blade occurring in standard calipers. One vertical wall of said slot is continuously planar, while the rearward portion of its opposite wall is offset outwardly, as indicated at 46, to widen the slot to admit claiper jaw 24, and the portion of slide 10 carrying it. Jaw 8 is held tightly against the planar wall of the slot by a horizontal plunger 48 (see FIG. 5), carried slidably in a bore 50 formed in the block and intersecting slot 44, and urged toward jaw 8 by a screw 52 threaded in said block coaxially with said plunger and having an enlarged knurled head 54 at one side of the block. At the opposite side of slot 44, bore 50 is provided with a permanent plug 56 for preventing accidental loss of the plunger. Jaw 8 is supported vertically by a pair of adjusting screws 58 threaded vertically into block 32 in spaced apart relation along slot 44, and projecting upwardly into said slot. Jaw 8 is pressed firmly downwardly against said screws by a clamp plate 60 carried slidably in a recess 62 formed in the top of block 32 adjacent caliper beam 4 and having at one edge thereof a pair of projecting fingers 64 operable to overlie the upper edge of jaw 8, respectively in front of and behind beam 4. Said fingers engage in the relief notches 18–20 of jaws 8 and 12, and are sufficiently thin that they do not interfere with the full closure of said jaws. Plate 60 is pressed downwardly by a vertical headed screw 66 extending downwardly through a slot 68 (see FIG. 4) formed in said plate, and threaded into block 32. The movement of plate 60 permitted by slot 68, when screw 66 is loosened, permits fingers 64 to be retracted from above slot 44 to release jaw 8. Jaw 8 may thus be initally placed and adjusted by inserting it into slot 44 with the heel thereof resting against a pin 70 (see FIG. 3) affixed in block 32 and projecting upwardly into slot 44, then placing an accurately planar object over the top of the block and adjusting screws 58 to press the operating edge of jaw 8 firmly against said object, then tightening screw 52 to press the jaw firmly against the planar wall of slot 44, and finally positioning and tightening clamp plate 60. Thereafter, the calipers may be removed from or reinserted in the block without changing the adjustment of screws 58, and the correct positioning of the calipers when reinserted will be automatic. Screws 58 permit the adaptation of the device for use with virtually any standard calipers, despite variations in the specific contours of jaw 8 which might occur.

Extension jaw assembly 34 includes a downwardly opening channel member 72 engageable over movable jaw 12 of the calipers, said channel being of sufficient width to receive therein caliper jaws of all normal thicknesses. At its rearward end, adjacent slide 10, said channel member is provided with an integral bridge member 74 connecting the side walls thereof, and extending transversely beneath jaw 12. Said bridge member is disposed within the relief notches 18 and 20 of jaws 8 and 12 when said jaws are closed, and does not interfere with the closing of said jaws. Also, when jaws 8 and 12 are closed, bridge member 74 engages in relief notches 75 formed in the top surface of block 32. Adjacent its forward end, said channel member has a set screw 76 threaded transversely in one side wall thereof, said set screw projecting into the interior of said channel and engaging a downwardly bevelled surface 78 of jaw 12. Caliper jaws are virtually always provided with such bevelled surfaces, for better access of said jaws to restricted grooves or notches of work pieces to be measured, or said bevelled surface could be formed specially on jaw 12 to adapt the calipers for use with the present device. A set screw 80 is threaded into the top connecting wall of channel 72, intermediate the ends thereof, and projects into the channel to engage the top edge of jaw 12, as shown. The channel is initially adjusted to jaw 12 by slipping it rearwardly over said jaw with set screws 76 and 80 loosened, then tightening screw 76 against bevel 78 to bring the lower edge of the channel into parallel relation to operating edge 16 of the jaw, and finally tightening screw 80. The lower edge of the channel will then be spaced somewhat above jaw edge 16 to permit freer use of said jaw, as will appear.

Thereafter, the channel will ordinarily be removed from or mounted on the jaw by manipulation of set screw 80 only, and will thereby always be fixed to the jaw in precisely the same relationship thereto. Channel 72 is of such depth as to accommodate jaws 12 of many different sizes and configurations.

The forward end of channel member 72, in outwardly spaced relation from the free end of jaw 12, is formed to present a vertically extending rib 82 which is engaged slidably in a vertical groove 84 formed in the rearward side of a vertical leg 86 which projects downwardly from said channel member. A headed set screw 88 extends through a longitudinally elongated slot 90 of said leg and is threaded into rib 82, whereby said leg is adjustably affixed to channel 72. A forwardly projecting extension jaw 92 is permanently affixed at its rearward end in the lower end of leg 86. Leg 86 is adjusted by resting block 32 on surface 40, with caliper jaw 8 fixed in said block, and channel 72 affixed on caliper jaw 12, all as previously described, then, with set screw 88 loosened, closing jaws 8 and 12 to procure a zero reading on dial 26. Leg 86 may then be adjusted vertically until jaw 92 just touches surface 40, as shown in FIG. 3, and set screw 88 tightened. The calipers are then ready for use in their converted status as a height measuring instrument. Oridnarily, the entire jaw assembly, including channel 72 and leg 86 as well as jaw 92 itself, will thereafter be removed from jaw 12, or reapplied thereto, by manipulation of set screw 80 only.

In use, it will thus be apparent that the vertical height of any object resting on surface 40 may be accurately measured by moving slide 10 on beam 4 to rest extension jaw 92 on top of said object. The height of said object may then be read from caliper scale 6 and dial 26. Moreover, the reading is a direct or zero-reading, with no requirement that a correction factor, such for example as the thickness of block 32, be applied to the caliper reading. The necessity of such correction factors, in prior devices of this general type, is a constant source of error, since while seemingly simple and straightforward, there is always the danger that the user may forget to apply it. For this purpose it is of course essential that the downward offset of extension jaw 92 from caliper jaw 12, or in other words the effective length of leg 86, be precisely equal to the vertical height at which fixed caliper jaw 8 is supported above surface 40 by block 32. It will be seen also that so long as fixed caliper jaw 8 is precisely flush with the top surface of block 32, direct or zero-readings of the height of any object resting on the block itself may be taken. For this purpose, it is additionally required that the vertical offset of extension jaw 92 from jaw 12 be precisely equal to the vertical thickness of block 32. Also, if the forward or free end of extension jaw 92 is sharpened as shown, it may be used as a scriber for marking a line on any object resting on surface 40, at a fixed distance above said surface, simply by sliding block 32 along said surface.

Other advantages of the conversion accessory as shown, are that it is relatively simple and inexpensive, that it is universally adjustable for use with pre-existing calipers having wide variations as to jaw thickness and configuration, and that once it is adjusted for use with any given set of calipers, by the proper setting of screws 58, 76, and 88, it may be repeatedly removed from and reapplied to that set of calipers without necessity of making the adjustments again.

While I have shown and described a specific embodiment of my invention, it will be readily apparent that many minor changes of structure and operation could be made without departing from the spirit of the invention.

What I claim as new and desire to protect by Letters Patent is:

1. A device for converting a set of vernier or dial calipers for use as a height measuring instrument, said device comprising:
   a. a block adapted to rest solidly on any planar surface,
   b. means for mounting the fixed jaw of said calipers in said block, with the beam of said calipers, carrying the movable jaw thereof, projecting vertically upwardly from said block,
   c. a horizontal extension jaw, and
   d. means for mounting said extension jaw rigidly on the movable jaw of said calipers, whereby said extension jaw is offset vertically below said movable jaw, and in horizontally offset relation from said fixed jaw and from said block said movable caliper jaw being provided with a downwardly tapering surface at the free end thereof, said mounting means comprising:
      1. a downwardly opening channel member engageable over said movable caliper jaw and extending outwardly beyond the free end thereof,
      2. a bridge member interconnecting the lower edges of the channel walls so as to underlie the lower edge of said movable caliper jaw at the end thereof adjacent said caliper beam and remote from the free end of said jaw,
      3. a first set screw threaded transversely into said channel member and projecting into the interior of said channel member to engage the tapered surface of said movable caliper jaw,
      4. a second set screw threaded into the top of said channel member and extending into the interior thereof to engage the top edge of said movable caliper jaw intermediate said bridge member and said first set screw, and
      5. a vertical leg affixed adjacent its upper end to the outer end of said channel member and extending downwardly therefrom, said extension jaw being affixed at one end to the lower end of said leg and extending horizontally therefrom.

2. A device as recited in claim 1 wherein said fixed and movable caliper jaws have relief notches formed therein in alignment with said bridge member of said channel member, said bridge member engaging in said relief notches whereby it does not interfere with the full closing of said jaws.

* * * * *